April 4, 1944.  A. WIRTH  2,345,783
WEIGHING APPARATUS OR SCALE
Filed June 26, 1941
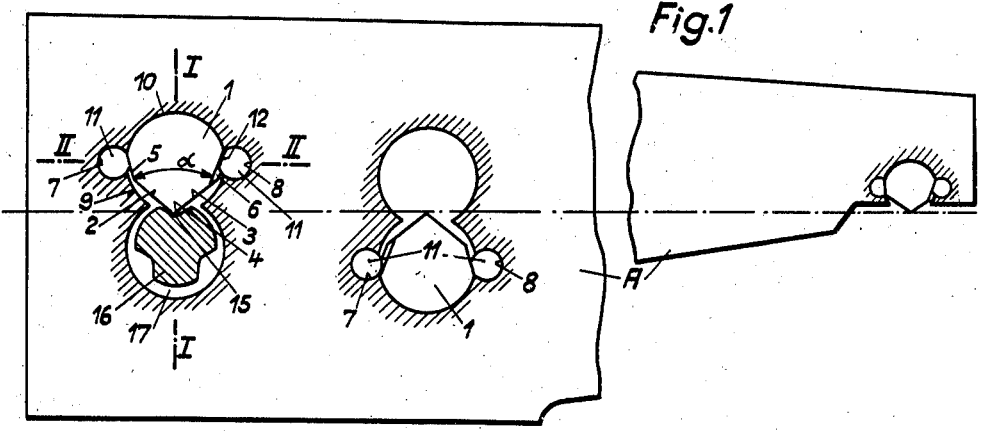
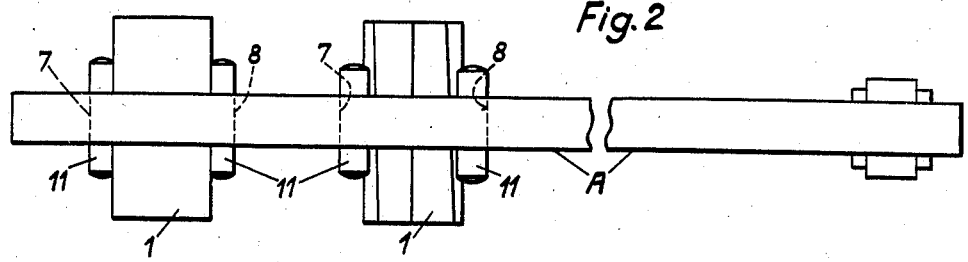
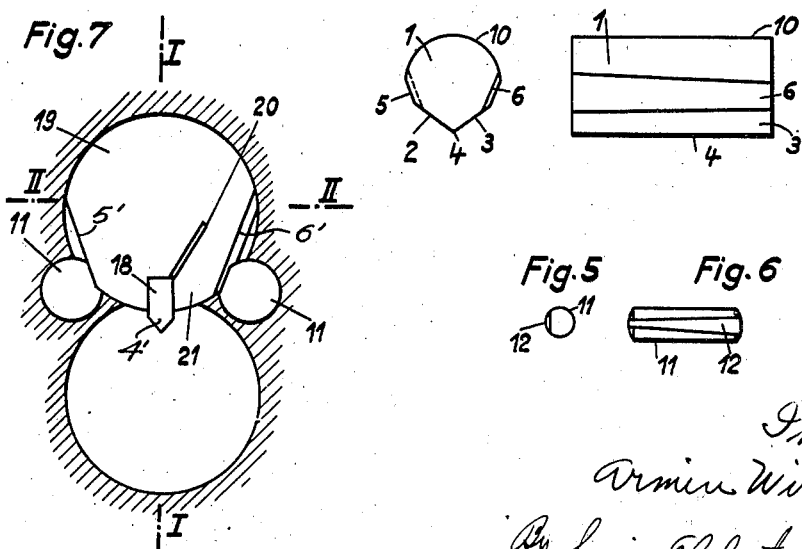
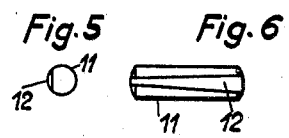
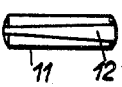
Inventor
Armin Wirth
By Singer Ehlert Stern & Carlberg
attys.

Patented Apr. 4, 1944

2,345,783

UNITED STATES PATENT OFFICE 2,345,783

WEIGHING APPARATUS OR SCALE

Armin Wirth, Zurich, Switzerland

Application June 26, 1941, Serial No. 399,894
In Switzerland July 2, 1940

4 Claims. (Cl. 308—2)

The present invention relates to weighing apparatuses or scales in general and particularly to improvements in lever mechanism connected therewith.

The broad object of the present invention is to provide an improved bearing and adjusting means for the knive edge. Another object of the invention is to reduce the cost of manufacturing of such a bearing by simplifying the construction of the individual parts and reducing the cost of assembling the finished parts.

A further object consists in the provision of a bearing, the parts of which may be cheaply manufactured in quantity and with great accuracy.

A further object consists in providing simple and efficient means to adjust the knife edge in a lever say the weighbeam of the weighing apparatus with extreme accuracy and by simple means.

Other objects and advantages of the present invention will be pointed out or will be apparent from the following specification.

In the drawing preferred embodiments of the invention are shown.

Fig. 1 is a side elevation of a part of a beam illustrating the arrangements of the bearings.

Fig. 2 is a top plan view.

Figs. 3 and 4 show the bearing block in a front view and in side elevation.

Figs. 5 and 6 show a cotter in a face view and in a side elevation.

Fig. 7 is a face view of a modified bearing construction.

In the drawing, A denotes a lever of the weighing apparatus in which three bearings are arranged, all of which are alike.

Each bearing comprises a bearing block 1 of substantially cylindrical shape. The bearing block fits a bore 9 of lever A and is provided with a knife edge 4 formed by two flat faces 2, 3 symmetrically arranged with reference to the plane I—I of Fig. 1. Adjacent the faces 2, 3 tapering faces 5, 6 are arranged at an angle of the said faces, tapering in opposite direction. The taper is about 1 to 50. On both sides of the plane I—I two parallel bores 7, 8 are arranged, the centre lines thereof being on a plane II—II passing through the centre line of the bore 9. In each bore 7, 8 a cylindrical cotter pin 11 is arranged fitting properly in the bores. Each cotter pin has a flat face 12 with a taper corresponding to that of the faces 5 or 6 of the bearing block 1. By driving the cotter pins into their bores 7, 8 they slide on the faces 5 and 6 of the bearing block 1 which is pressed on the wall 10 of the bore 9. To attain a good fit the diameter of the block 1 is very slightly greater than the diameter of the bore 9. If one of the cotter pins 11 is driven in more than the other, the block 1 is turned in the bore 9 and the knife edge 4 is shifted accordingly in the direction of lever A. The knife edge 4 co-operates with a V-shaped groove 15 of a body 16 of known construction passing freely through a bore 17 of lever A.

In Fig. 7 a bearing is shown having a block 19 with the faces 5' and 6'. In a groove of said block 19 a body 18 is inserted in which the knife edge 4' is formed. A slot 20 passes from said groove upwards. A claw 21 is formed by said slot 20 which is tightly pressed on the body 18 by driving in the cotter pin 11.

The construction herein described provides a simple and efficient bearing, the main parts of which being cylindrical are easily made true to size. The absence of screws in the assembled bearing is a decided advantage from the standpoint of cheapness of construction and ease of assembling and adjusting. Nevertheless the accuracy is very high and may be attained with unskilled labor.

It is not the desire to limit the invention to the precise embodiments shown and described, as it is capable of adaptations and variations all within the following claims.

Having thus described my invention, what I claim as new and desire to secure by Letters Patent is:

1. In a device of the character described, in combination, a bearing support, a cylindrical bearing block provided with a knife edge and seated in said bearing support, said support having a bore in which said cylindrical bearing block is mounted, two cylindrical pins mounted in other bores of said support intersecting the first named bore on opposite sides of a plane passing through the knife edge and the center of said bearing block, said cylindrical bearing block being provided with two flat uniplanar tapering faces at an angle to the knife edge and said pins having each one flat face of corresponding taper engaging the adjacent tapering uniplanar flat face of said bearing block.

2. In a device of the character described, in combination, a bearing support, a cylindrical bearing block provided with two flat faces terminating in a knife edge which is seated in said bearing support, said support having a bore in which said cylindrical bearing block is mounted, two cylindrical pins mounted in other bores of said support on opposite sides of a plane passing through the knife edge and the center of said bearing block, said cylindrical bearing block being provided with two additional uniplanar flat tapering faces one on each side of said knife edge angularly related to the knife edge and said pins having each one flat uniplanar face of corresponding taper each engaging one of the last named flat faces of said bearing block.

3. In a device of the character described, in combination, a lever, a cylindrical bearing block provided with a groove in which a blade having a knife edge is mounted, a slot extending from the bottom of said groove and terminating within the body of said bearing block at a point spaced from the circumference of the same, said lever having a bore in which said cylindrical bearing block is mounted, two cylindrical pins mounted in bores of said lever on opposite sides of a plane passing through the knife edge and the center of said bearing block, said cylindrical bearing being provided with two flat uniplanar tapering faces and said pins having each one flat face of corresponding taper engaging the adjacent uniplanar flat face of said bearing block, the pin closest to said slot in said bearing block exerting a pressure upon the engaged portion of the bearing block which clamps the blade having the knife edge in position in said groove.

4. In a device of the character described, the combination of a bearing support provided with a cylindrical bore, a cylindrical bearing block with a knife edge parallel to its axis and with uniplanar wedge faces at angles to said axis, and means for adjustably locking said cylindrical bearing block in its cylindrical bore to present the knife edge along selectively determined axial lines of the bore, said means comprising cylindrical elements provided with uniplanar wedge faces and insertible in said support in a direction parallel to the axis of said bore, and cooperating on their uniplanar wedge faces with the uniplanar wedge faces of the bearing block.

ARMIN WIRTH.